United States Patent [19]

Yamaguchi

[11] 4,132,673

[45] Jan. 2, 1979

[54] PROCESS FOR THE PRODUCTION OF A CATALYST

[75] Inventor: Shigeto Yamaguchi, Tokyo, Japan

[73] Assignee: Riken Keiki Kabushiki Kaisha, Tokyo, Japan

[21] Appl. No.: 767,473

[22] Filed: Feb. 10, 1977

[30] Foreign Application Priority Data

Mar. 19, 1976 [JP] Japan .................................. 51-29301
Nov. 26, 1976 [JP] Japan ................................ 51-141327

[51] Int. Cl.$^2$ ........................ B01J 21/04; B01J 23/42; B01J 23/44
[52] U.S. Cl. ............................................. 252/466 PT
[58] Field of Search ................... 252/466 A; 427/435, 427/436

[56] References Cited

U.S. PATENT DOCUMENTS

| 3,198,240 | 8/1965 | Keith et al. ..................... 252/466 PT |
| 3,880,775 | 4/1975 | Gandhi et al. .................. 252/466 PT |
| 3,962,139 | 6/1976 | Van de Moesdi, Jr. et al. ... 252/466 PT |
| 3,992,512 | 11/1976 | Petrow et al. .................. 252/466 PT |

*Primary Examiner*—W. J. Shine
*Attorney, Agent, or Firm*—James E. Nilles

[57] ABSTRACT

A process for the preparation of a catalyst comprises abrading a solid metallic material selected from platinum, palladium, platinum-palladium alloys and mixtures thereof, in the presence of an aqueous alumina suspension to obtain a suspension which contains finely divided particles of the metallic material and the alumina uniformly dispersed throughout, applying the thus obtained suspension to a support, and then removing the water therefrom to obtain the desired catalyst.

6 Claims, 1 Drawing Figure

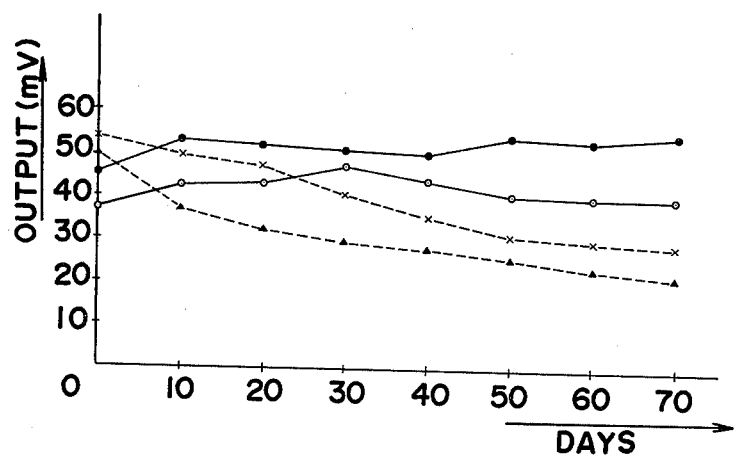

PROCESS FOR THE PRODUCTION OF A CATALYST

This invention relates to a process for the production of a catalyst which consists of platinum and/or palladium and is used specifically as an oxidation catalyst.

Conventional platinum and/or palladium catalysts use alumina as a support. Production of a combustive gas detection element having a platinum catalyst, for example, is carried out in the following manner. Namely, an aqueous aluminum nitrate solution is first applied to a platinum wire coil and then subjected to the oxidation treatment by heating to thereby form a catalyst support layer consisting of alumina on the platinum wire coil. Next, a hydrochloric acid solution dissolving therein platinum chloride is coated to the surface of the catalyst support layer thus formed and heated to about 800° C. to heat-decompose this compound and to form metallic platinum on the catalyst support.

In the catalyst obtained by the above-mentioned method, however, drawbacks have been in that the platinum compound causes heat-decomposition at the time of sintering and forms impurities such as platinum chloride in addition to the contemplated metallic platinum, and crystals of platinum grow into coarse macrocrystals thereby reducing the catalytic activity and increasing the deterioration with time. For these reasons, gas detection element using this type of catalyst can not perform the gas detection with high accuracy for an extended period of time.

The primary object of the present invention is to provide a process for the production of a platinum and/or palladium catalyst which is free of the above-mentioned problems, has a large catalytic activity and maintains the activity for a long period of time.

Other objects, features and advantages of the present invention will be readily apparent from the following detailed description of a preferred embodiment thereof taken in conjunction with the accompanying sole drawing which is a diagram illustrating the deterioration in activity with time of a gas detection element using a platinum catalyst prepared in accordance with the present process in comparison with a prior art gas detection element.

In accordance with the process of the present invention, metallic platinum, metallic palladium such as a palladium plate, or a platinum-palladium alloy plate, etc., is ground and abraded mechanically on a grindstone, for example, using an aqueous suspension of gamma-alumina as an abrasive or an abrasive liquid. The resulting ground liquid in the form of paste as a material for the catalyst is coated to a proper support such as a platinum wire coil, for example, and then sintered to thereby form a gas detection element. Alternatively, the above-mentioned ground liquid is allowed to impregnate asbestos and then dried to thereby form a a catalyst for a body warmer using benzine.

In the above-mentioned process of this invention, the ground liquid in paste form is a suspension of alumina in which finely divided particles of platinum and/or palladium are dispersed extremely uniformly. This results from the following facts. Namely, the platinum and/or palladium or platinum-palladium alloy is abraded away into extremely small particles (of smaller than about 50 Å) by alumina as the abrasive. Moreover, since the crystals of both metal and alumina (especially gamma-alumina) are of a tesseral face-centered type and the interatomic distance of the metals in these crystals is substantially equal to that of oxygens in the alumina, the bonding strength acts, though slightly, between the metal and the alumina particles due to the lattice fit. This bonding strength in turn causes the metal particles to disperse uniformly in the alumina suspension.

In order to form the finely divided metal particles having the catalytic activity, the process of the present invention employs mechanical means for grinding, but does not employ the chemical reaction such as heat-decomposition of the solution of the compounds. Hence, the present process eliminates perfectly the admixture of impurities that act as the catalyst poison.

The catalyst obtained by the process of the invention consists of finely divided particles of platinum and/or palladium metal dispersed uniformly in the support and does not contain any impurity. In consequence, the catalyst of the invention has an extremely high catalytic activity. Especially the present catalyst has low deterioration of the catalytic activity with time.

Further, the catalyst of the present invention contains alumina, which can be used as a support by itself. For producing a gas detection element, for instance, the afore-mentioned ground liquid is applied to a platinum wire coil, dried and if desired, sintered whereby the platinum and/or palladium particles are dispersed uniformly in the support of alumina to form a catalyst. Accordingly, the process of the present invention eliminates the production step of the support itself and the sintering temperature can be lowered because the heat-decomposition is not required.

Examples of grindstones that may be used in the process of the present invention are white oil grindstone, Arkansas grindstone, and the like. During the abrading step, the grindstone also is abraded and its finely divided particles are admixed in the ground liquid in paste form. However, they do not exert any adverse effect on the catalytic activity. On the contrary, the finely divided particles of the grindstone yields a desirable effect for the catalyst component to disperse.

As an abrasive or an abrasive liquid, the process of the present invention uses, for example, an aqueous suspension of alumina containing 20–50% by weight of alumina of an average particle size of 50 Å.

The catalyst obtained in accordance with the process of the present invention hardly exhibits any deterioration with time as will be appreciated from the following illustration. Namely, two types of gas detection elements are prepared from the catalyst particles which are produced by the process of the present invention and contain of 10% by weight of alumina on the basis of the platinum particles while two other types of gas detection elements are prepared similarly in accordance with the prior art process. These gas detection elements of the present invention and the prior art process are placed in the atmosphere containing 0.6% by volume of iso-butane gas, respectively, and applied with an electric current of 1.5 V, 300 mA once a day. The change with time in the output voltage of the gas detection elements is plotted as shown in the accompanying drawing, in which the full line indicates the detection elements of the present invention and the broken line does the gas detection elements of the prior art.

From the curves it can be appreciated that the catalyst obtained in accordance with the process of the present invention accomplishes the gas detection in a stable manner for an extended period of time, for example, even after 70 days' time has been passed away. In contrast therewith, the catalysts in accordance with the prior art process decrease the output by about 30–40% after one month and about 60–70% after 70 days when compared with the initial output, respectively. It is thus appreciated that the catalysts in accordance with the present process maintain their excellent catalytic activity over a long period of time.

Though not illustrated specifically in the typical embodiment mentioned above, two platinum metals or two palladium metals or two platinum-palladium alloys may be abraded with each other without using a grindstone. In this instance, the metallic particles can be further divided into fine particles (of about 20–50 A). Alternatively, either metallic platinum and metallic palladium may be abraded simultaneously using a single grindstone, or they may be abraded mutually without using a grindstone, so as to obtain a platinum-palladium catalyst. The ground liquid obtained by these methods exhibits the effect of the invention in the same way as in the above-mentioned embodiment.

As noted in the foregoing paragraphs, in accordance with the process of the present invention, a catalyst having a high catalytic activity can be produced extremely simply and advantageously whereby the finely divided platinum and/or palladium metal particles are dispersed uniformly in alumina without allowing admixture of any impurity.

What is claimed is:

1. A process for the preparation of a catalyst comprises abrading a metallic material selected from platinum, palladium, platinum-palladium alloys and mixtures thereof, in the presence of an aqueous alumina suspension to obtain an aqueous suspension which contains finely divided particles of the metallic material and alumina uniformly dispersed therethrough, applying the thus obtained suspension to a support and then removing the water therefrom to obtain the catalyst.

2. The process of claim 1 in which the metallic material is platinum.

3. The process of claim 1 in which the metallic material is palladium.

4. The process of claim 1 in which the metallic material is a platinum-palladium metal alloy.

5. The process of claim 1 in which the suspension is applied to the support by coating the support and after the water is removed the coated support is sintered.

6. The process of claim 1 in which the suspension is applied to the support by impregnating the support with the suspension and the water is removed by drying.

* * * * *